United States Patent [19]

Minoura et al.

[11] 4,314,154

[45] Feb. 2, 1982

[54] TWO-DIMENSIONAL SCANNING DEVICE HAVING COMPENSATION FOR SCANNED IMAGE STRAIN

[75] Inventors: Kazuo Minoura, Yokohama; Takehiko Kiyohara, Zama; Haruo Uchiyama, Kawasaki, all of Japan

[73] Assignee: Canon Kabushiki Kaisha, Tokyo, Japan

[21] Appl. No.: 109,278

[22] Filed: Jan. 3, 1980

[30] Foreign Application Priority Data

Jan. 17, 1979 [JP] Japan .................................. 54/3034

[51] Int. Cl.³ .............................................. H04N 1/04
[52] U.S. Cl. .................................... 250/235; 350/6.6; 350/6.7; 355/8; 358/206; 358/293
[58] Field of Search ................. 250/234, 235, 236; 350/6.8, 6.6, 6.7, 486; 355/8; 358/205, 206, 285, 293

[56] References Cited

U.S. PATENT DOCUMENTS 3,970,359  7/1976  Starkweather ................... 350/6.8
4,070,089  1/1978  Grafton ............................ 250/236

Primary Examiner—David C. Nelms
Assistant Examiner—Edward P. Westin
Attorney, Agent, or Firm—Fitzpatrick, Cella, Harper & Scinto

[57] ABSTRACT

A two-dimensional scanning device provided with a first deflector for deflecting a collimated beam, a second deflector for deflecting the incident beam in a direction orthogonal to the deflection direction of the first deflector, a scanning lens disposed between the first deflector and the second deflector, a scanning surface for imaging the scanning beam from said scanning lens through the second deflector, and a device for moving the scanning lens in the direction of its optic axis in synchronism with the rotation of the second deflector to thereby obtain a strain-free two dimensional scanning figure on the scanning surface.

8 Claims, 2 Drawing Figures

TWO-DIMENSIONAL SCANNING DEVICE HAVING COMPENSATION FOR SCANNED IMAGE STRAIN

BACKGROUND OF THE INVENTION

1. Field of the Invention

This invention relates to a device for effecting writing or reading of a two-dimensional scanning figure, and more particularly relates to a two-dimensional scanning device which can generate a strain-free light beam scanning image on the plane of a fixed scanned medium.

2. Description of the Prior Art

Two-dimensional scanning devices of this type are used in laser printers in which a laser beam is modulated in accordance with image information of, for example figures or characters, from an electronic computer or a facsimile image transmitter, and the modulated beam is two-dimensionally deflected. Hard copies of high quality may be produced at a high speed by such devices when used in conjunction with an electrophotographic method or a heat mode recording method. Alternatively, such devices may be used in a facsimile image transmitter in which an unmodulated laser beam is two-dimensionally deflected and is caused to impinge on a two-dimensional figure and the reflected light therefrom is photoelectrically converted to obtain two-dimensional image information. In two-dimensional scanning devices according to the prior art, distorted, or strained scanning is effected on the scanned surface to correct such strained scanning, a position detector or a large capacity memory device have been used. A correcting operational circuit has also been used to effect electrical correction, but all such electrical signal treating approaches have unavoidably led to complicated construction of the device.

SUMMARY OF THE INVENTION

It is therefore an object of the present invention to provide a two-dimensional scanning device which is appropriately constructed so as to eliminate any two-dimensional scanning strain by optical and mechanical means without using the electrical signal approaches as described above.

It is a further object of the present invention to provide a two-dimensional scanning device in which a light beam scanning a scanned surface scans at equal speed in the major scanning direction and in the minor scanning direction.

The two-dimensional scanning device according to the present invention has a first deflector for effecting major scanning, a second deflector for effecting minor scanning of a light beam in a plane orthogonal to the deflecting surface of the first deflector, and an image forming optical system disposed between the first deflector and the second deflector for condensing the incident parallel beam onto a scanned plane. By varying the distance between this image forming optical system and the second deflector in synchronism with the deflecting action of the second deflector, it is ensured that the position of the focus of the image forming optical system lies on the scanned plane, and two-dimensionally strain-free scanning can be effected.

In the two-dimensional scanning device according to the present invention, the image forming characteristic, or strain characteristic, of the image forming optical system is selected in accordance with the deflecting characteristic of the deflecting-reflecting surface governing the major scanning direction of the light beam on the scanned plane, whereby the speed of the light beam in the major scanning direction on the scanned plane is made constant. Further, by selecting to a predetermined value the deflecting characteristic of the second deflector, or in other words, the rotational speed of the deflecting-reflecting surface of the second deflector, the speed of the light beam on the scanned plane with respect to the minor scanning direction is made constant. The term "major scanning" used herein means the scanning for creating scanning lines on the scanned plane, and the term "minor scanning" means scanning the scanning lines in a direction orthogonal to the direction of the scanning lines. Accordingly, in two-dimensional scanning, the deflector for the major scanning beam-scans at a high speed to effect a number of deflections during one scanning of the scanned plane and the deflector for the minor scanning effects only one deflection during one scanning of the scanned plane.

The invention will become more fully apparent from the following detailed description thereof taken in conjunction with the accompanying drawings.

DESCRIPTION OF THE PREFERRED EMBODIMENTS

Figure 1:
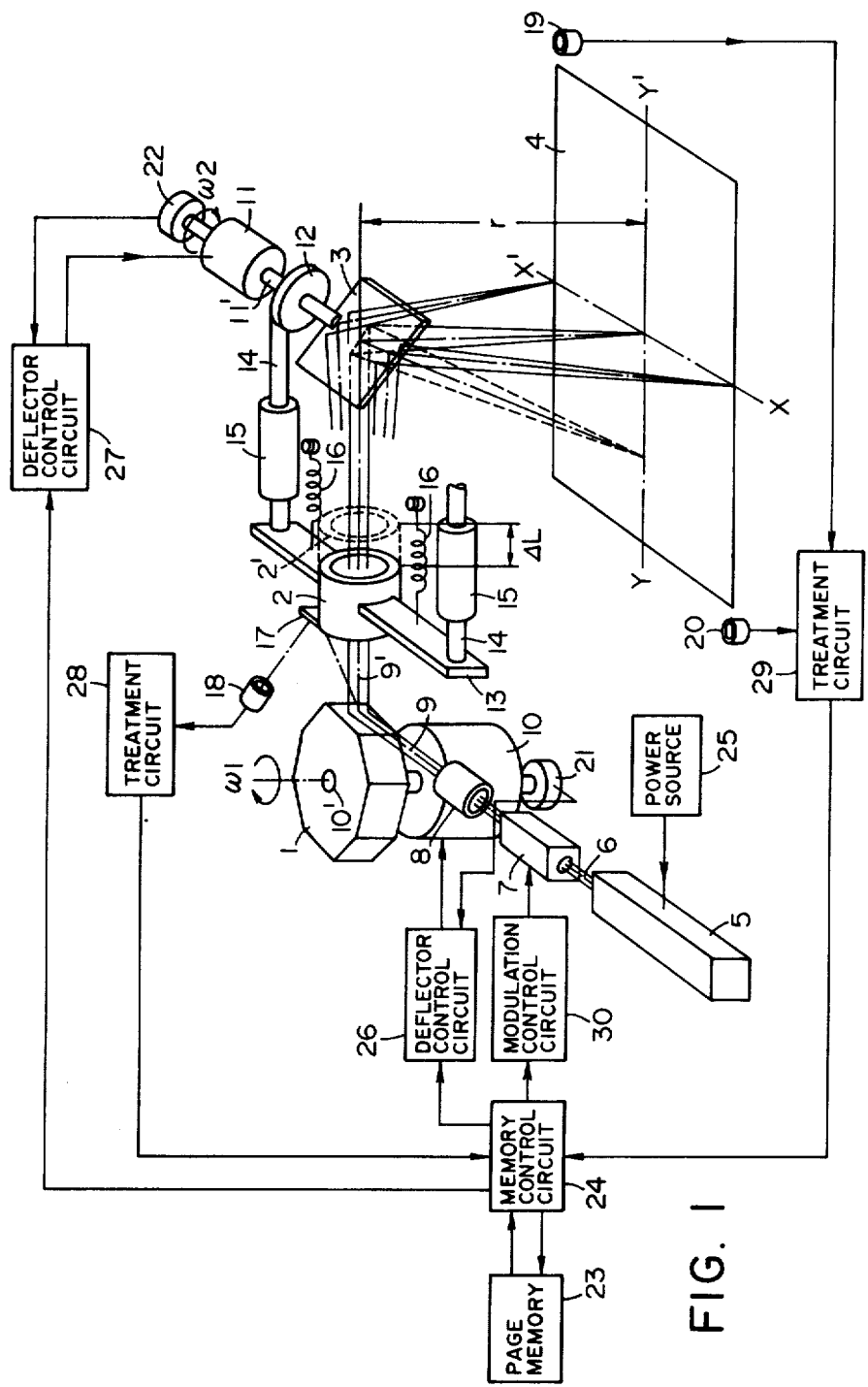
FIG. 1 shows an embodiment of the two-dimensional scanning device according to the present invention.

Referring to FIG. 1 which shows a first embodiment of the two-dimensional scanning device according to the present invention, reference numeral 1 designates a rotatable polygon mirror constituting a first deflector for effecting major scanning, reference numeral 2 designates an image forming scanning lens, reference numeral 3 denotes a rotatable mirror constituting a second deflector for effecting minor scanning, reference numeral 4 denotes the surface of a scanned medium or a recording medium, and reference numeral 5 designates a laser generator. A light beam 6 emitted from the laser generator 5 is modulated by a light modulator 7 as required, and is expanded in diameter by a beam expander lens 8. A collimated beam 9 thus emerges from the beam expander lens 8. The rotatable polygon mirror 1 is secured to the rotary shaft 10' of a drive motor 10. By the rotation of the drive motor 10, the rotatable polygon mirror 1 deflects the incident collimated beam 9 from the beam expander lens 8 and projects a deflected beam 9'. This deflected beam 9' enters the scanning lens 2, by which the deflected beam 9' is always imaged on the recording medium 4 via the rotatable mirror 3.

The image forming scanning lens 2 has a strain characteristic corresponding to the rotation characteristic of the rotatable polygon mirror 1 constituting the first deflector means and, if the scanning position in the X—X' direction on the scanned medium 4 for the rotation angle $\omega_1$ of the rotatable polygon mirror 1 is y', the strain characteristic of the scanning lens 2 is generally expressed as $$y' = F(\omega_1) \tag{1}$$

The scanning speed on the scanned medium 4 is obtained as follows by differenting equation (1) by time t:

$$\frac{dy'}{dt} = \frac{dF}{d\omega_1} \cdot \frac{d\omega_1}{dt} \tag{2}$$

Assuming that the left side of this equation (2) is equal to a constant k from the fact the scanning speed is constant, the following is obtained from equation (2):

$$\frac{dF}{d\omega_1} = k / \frac{d\omega_1}{dt} \tag{3}$$

By integrating this equation (3), the strain characteristic function F is obtained as $$F = \int \left[ k / \left( \frac{d\omega_1}{dt} \right) \right] \cdot d\omega_1 \tag{4}$$

That is, by setting the rotation characteristic $d\omega_1/dt$ of the rotatable polygon mirror 1 to a particular value, the strain characteristic of the scanning lens 2 can be determined from equation (4).

If the equal angular speed rotatable polygon mirror 1 is used as the first deflector and a lens having a focal length f and a strain characteristic of $y' = f \cdot \omega_1$ is used as the scanning lens 2, the scanning speed on the scanned medium 4 in the deflection direction X—X' by the first deflector means 1 will be constant from $$\frac{dy'}{dt} = f \cdot \frac{d\omega_1}{dt} = f \cdot k_1 = \text{constant} \tag{5}$$
$$(k_1 = \text{constant})$$

Since the rotatable mirror 3 constituting the second deflector is fixed to the rotary shaft 11' of the drive motor 11, as the drive motor 11 is rotated the light beam incident on the rotatable mirror 3 is scanned in the Y—Y' direction on the scanned medium 4. Thus two dimensional scanning is effected by the action of the mirror 1 and the mirror 3.

Next, with the standard distance between the rotatable mirror 3, which is the second deflector, and the scanned surface 4 as γ, the rotatable mirror 3 is rotated so that the rotation angle $\omega_2$ thereof satisfies the following relation for time t:

$$\omega_2 = \tfrac{1}{2} \tan^{-1} \frac{k_2}{\gamma} \cdot t \ (k_2 = \text{constant}) \tag{6}$$

and at the same time, the scanning lens 2 is displaced in parallel with the optical axis by ΔL to a position 2' indicated by broken lines in FIG. 1. This ΔL is varied in synchronism with the rotation characteristic of the second deflector 3 and follows the following relation:

$$\Delta L = \gamma (\sec 2\omega_2 - 1) \tag{7}$$

When the scanning lens 2 is moved in synchronism with the rotation of the second deflector 3, as described above, the scanning beam is always focused on the scanned medium 4, and equal speed scanning is effected.

That is, the scanning position Z' of the light beam in the Y—Y' direction on the scanned surface by the second deflector 3 for the rotation angle $\omega_2$ of the second deflector 3 is $$Z' = \gamma \tan 2\omega_2 \tag{8}$$

and hence, by combining equation (6) and equation (8), the following is obtained:

$$Z' = k_2 \cdot t \tag{9}$$

This means equal speed scanning.

Further, in FIG. 1, reference numeral 12 designates a rotatable cam secured to the rotary shaft 11' of the drive motor 11, and reference numeral 13 denotes arm members provided on the left and right sides of the image forming scanning lens 2. Slide shafts 14 studded on these arm members 13 are fitted in slide bearings 15 parallel to the optic axis to render the scanning lens 2 movable parallel to the optic axis. One end of each of the slide shafts 14 is always urged against the rotatable cam 12 by the tension of a spring 16. The rotatable cam 12 is fixedly fitted on the rotary shaft 11', on which is mounted the rotatable mirror 3 constituting the second deflector, and therefore when the rotatable mirror is rotated through the angle of $\omega_2$, that rotation is transmitted from the rotatable cam 12 through the slide shaft 14 to the scanning lens 2, which is thus moved by the distance ΔL given by equation (7).

A mirror 17 receives and reflects the deflected beam 9' emergent from the first deflector, namely, the rotatable polygon mirror 1, just prior to the deflection of the beam 9' across the scanning lens 2. The beam 9' contains no picture information at this time in the scan. A photodetector element 18 receives the deflected beam from the mirror 17 and in response supplies a photodetection signal to a photodetection signal treatment circuit 28. This circuit 28 generates an information discharge signal for each line scan, and such signal is supplied to a memory control circuit 24. A photodetector element 19 disposed near the recording medium 4 receives the deflected beam scan line first scanned by the second deflector means 3 in each scanning of the scanned plane, and generates a modulation start reference signal. A photodetector element 20 disposed near the recording medium 4 receives the deflected beam scan line lastly scanned by the second deflector means 3 in each scanning of the scanned plane, and generates a scanning termination reference signal.

A rotational position signal generator 21 is provided on the rotary shaft 10' of the drive motor 10 to provide first deflected position signals. This generator 21 may be an encoder of the optical type or of the magnetic induction type, or it may be a potentiometer of the electrical resistance type or of the capacity type. The first deflected position signal from the rotational position signal generator 21 is supplied to a first deflector control circuit 26. This control circuit 26 compares the first deflected position signal with the output of a reference clock existing therein and, if there is a difference between the two, the control circuit 26 supplies a correction signal to the drive motor 10 to control the motor so that it is always rotated at a predetermined angular speed. Designated by 22 is a rotational position signal generator provided on the rotary shaft 11' of the motor 11 for to provide second deflected position signals. The second deflected position signal from the rotational position signal generator 22 is applied to a second deflector control circuit 27. This control circuit 27 compares the second deflected position signal with a reference clock existing therein and if there is a difference between the two, the control circuit 27 supplies a correction signal to the motor 11 to control the motor 11 so that it is always rotated at a predetermined angular speed.

A page memory 23 stores therein image information data such as figures or characters from an electronic computer or a facsimile image transmitter. The beam detection signal generated by the photodetector 19 on which the beam from the second deflector means 3 impinges is treated by the photodetection signal treatment circuit 29 and after a predetermined time has elapsed, an effective scanning start signal is applied to a memory control circuit 24 for the page memory 23. This memory control circuit 24 instructs the page memory 23 to discharge data, in synchronism with the effective scanning start signal. Further, the data of the page memory 23 are successively read out bit by bit for each scanning line with the information discharge signal from the photodetection signal treatment circuit 28 as the trigger signal, and applied to a modulation control circuit 30. While the beam provided by the reflecting surface of the first deflector means 1 is scanning the X—X' direction of the scanned medium 4, the data for one scanning line stored in the page memory 23 is applied from the modulation control circuit 30 to the modulator 7 and the light and dark pattern of one scanning line is thus imparted to the laser beam 6.

While the first deflector means 1 is scanning one scanning line, the second deflector means 3 moves the beam by an amount corresponding to a suitable scanning line interval. When the two-dimensional scanning of the scanning beam on the surface of the scanned medium 4 approaches an end, the photodetector 20 receives the scanning beam and generates an effective scanning termination signal. This signal is treated by the photodetection signal treatment circuit 29 and a data discharge mode stop signal is applied to the memory control circuit 24. By this, the page memory 23 is caused to stop its data discharge mode. Simultageously therewith, the memory control circuit 24 gives an initial position reset instruction to the first and second deflector control circuits 26 and 27 in synchronism with the effective scanning termination signal. By this, the first deflector 1 and the second deflector 3 are returned to their initial positions and stop operating. Designated by 25 is a driving power source for the laser oscillator 5.

Figure 2:
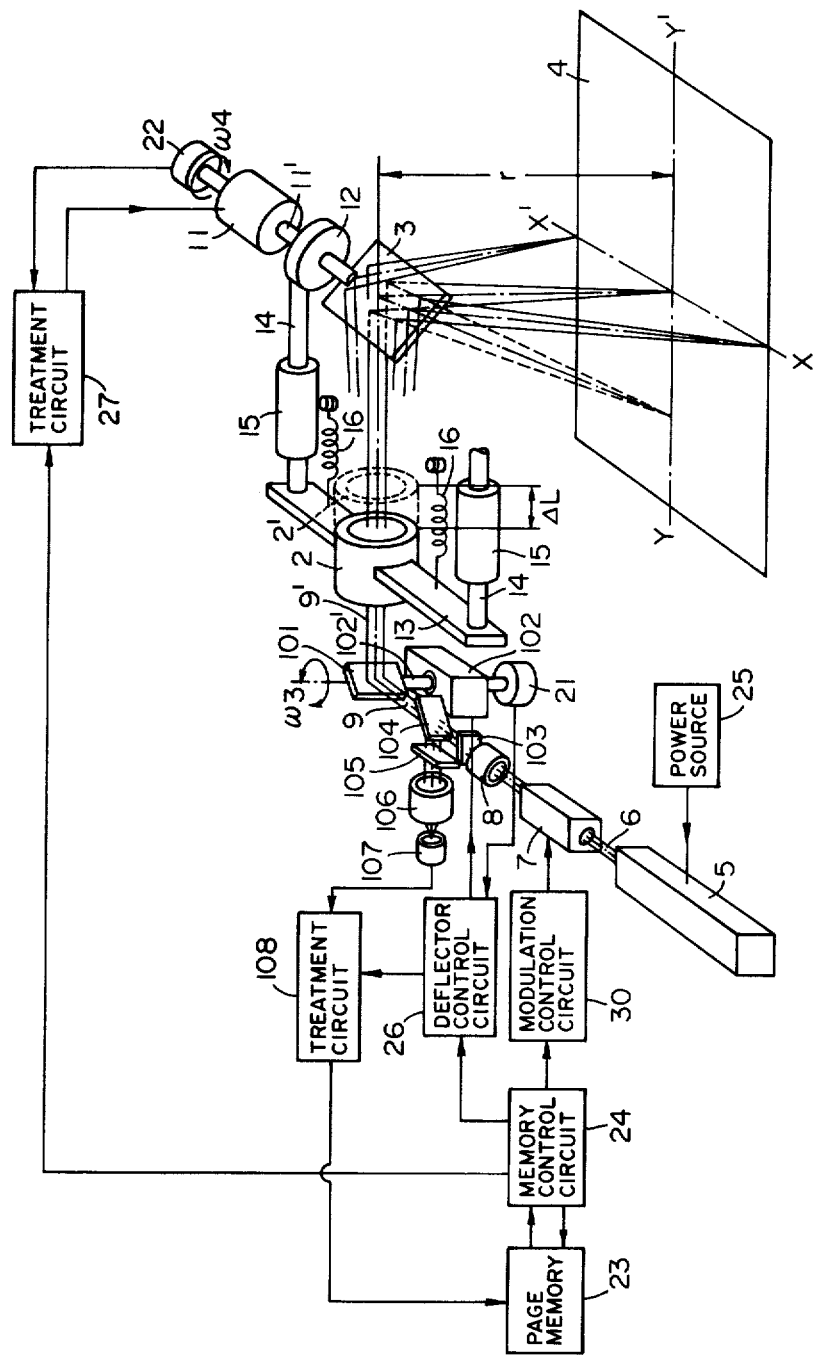
FIG. 2 shows another embodiment of the two-dimensional scanning device according to the present invention.

Reference is now had to FIG. 2 to describe another embodiment of the present invention. In FIG. 2, components similar to those of FIG. 1 are given similar reference characters and need not be described. The light beam 6 emitted from a laser generator 5 is modulated by a modulator 7, as required, and the modulated beam has the diameter thereof expanded by a beam expander lens 8 while, at the same time, the beam is collimated. The light beam having left the beam expander lens 8 passes through a polarizing plate 103 and a half-mirror 104 to a vibratory mirror 101 constituting first deflector means. This vibratory mirror 101 is fixed to the rotary shaft 102' of a reciprocally moving motor 102 and deflects the incident beam 9 in accordance with the reciprocal movement of the reciprocally moving motor 102 to project a deflected beam 9'. This deflected beam 9' is always imaged on a scanned medium surface 4 by a scanning lens 2.

The scanning lens 2 has a strain characteristic corresponding to the rotation characteristic of the vibratory mirror 101 constituting the first deflector. If a mirror making sinusoidal vibration of amplitude $\phi_0$ is used as the first deflector 101 and if a lens having a focal length f and a strain characteristic expressed by $$y' = 2\phi_0 f \sin^{-1} \frac{\omega_3}{\phi_0} \tag{10}$$

where y' is the position of the light beam on the scanned medium 4 with respect to the X—X' direction for the rotation angle $\omega_3$ of the first deflector, is used as the scanning lens 2, then the scanning speed on the scanned medium 4 in the deflection direction X—X' by the first deflector 101 will be constant. That is, the rotation angle $\omega_3$ of the first deflector 101 is $$\omega_3 = \phi_0 \sin k_3 \cdot t \tag{11}$$
$$(k_3 = \text{constant})$$

and if equation (10) is combined with equation (11), the following is obtained:

$$y' = 2\phi_0 f k_3 \cdot t \tag{12}$$

It is thus seen that the scanning speed is constant.

Since the rotatable mirror 3 constituting the second deflector is fixed to the rotary shaft 11' of the drive motor 11 as in the previous embodiment, the light beam incident on the rotatable mirror 3 is scanned in the Y—Y' direction. Thus, two-dimensional scanning is effected on the scanned medium 4 as in the previous embodiment.

Next, with the standard distance between the second deflector means 3 and the scanned surface 4 as $\gamma$, the second deflector 3 is rotated so that the rotation angle $\omega_4$ thereof follows the relation that $$\omega_4 = \tfrac{1}{2} \tan^{-1} \frac{k_4}{\tau} \cdot t \tag{13}$$
$$(k_4 = \text{constant})$$

for time t, and the scanning lens 2 of the scanning optical system is displaced in parallel with the optical axis by $\Delta L$ to a position 2' indicated by broken line. This $\Delta L$ is varied in synchronism with the rotation characteristic of the second deflector 3 and follows the relation that $$\Delta L = \gamma(\sec 2\omega_4 - 1) \tag{14}$$

The scanning position Z' on the scanned surface 4 by the second deflector 3 is $$Z' = \gamma \tan 2\omega_4 \tag{15}$$

and hence, by combining equation (13) with equation (15), $$Z' = k_4 \cdot t \tag{16}$$

This means equal speed scanning.

As in the previous embodiment, slide shafts 14 studded on arm members 13 provided on the left and right sides of the image forming scanning lens 2 are fitted in slide bearings 15 parallel to the optic axis and therefore, the image forming scanning lens 2 is movable parallel to the optic axis. One end of each of the slide shafts 14 is always urged against a rotatable cam 12 by the tension of a spring 16. The rotatable cam 12 is fixedly fitted on the shaft 11' on which the rotatable mirror 3 constituting the second deflector is mounted and therefore, when the rotatable mirror 3 is rotated through the angle of $\omega_4$, that rotation is transmitted from the rotatable cam 12 through the slide shaft 14 to the scanning lens 2, which is thus moved by the distance $\Delta L$ given by equation (14).

A first deflector control circuit 26 having received the first deflected position signal from the rotational position signal generator 21 provided on the driving shaft 102' of the drive motor 102 for the first deflector 101, compares a drive wave pulse generated in the circuit 26 with the first deflected position signal, and determines the deflection frequency and amplitude of the deflector 101. The above-mentioned first deflected position signal is also used as the information discharge signal for each line scanning in in the manner described in the above-described first embodiment.

A second deflector means control circuit 27 having received the second deflected position signal from a rotational position signal generator 22 provided on the rotary shaft 11' of the motor 11 for driving the rotatable mirror 3 compares the second deflected position signal with a reference clock existing in the circuit 27 and if there is a difference between the two, it supplies a correction signal to the motor 11 to control the motor 11 so that it is rotated at a predetermined angular speed. Also, the second deflected position signal generated by the rotational position signal generator 22 is also used as the effective scanning start signal and the effective scanning termination signal described in connection with the first embodiment.

Next, when the device of the present embodiment is changed over to an original reading mode to effect original reading by placing an original to be read at the position of the scanned medium 4, the modulator 7 is caused to effect a constant level operation by a modulation control circuit 30. Accordingly, the laser beam 6 emitted from the laser oscillator 5 emerges from the modulator 7 unmodulated and enters the beam expander lens 8. The beam light emergent from the beam expander lens 8 is polarized by a polarizer 103 and further passes through a half-mirror 104 to the first deflector 101. The beam light emergent from the first deflector 101 two-dimensionally scans the surface of the original placed at the position of the scanned medium 4, with the aid of the scanning lens 2 and the second deflector 3. The reflected light from the surface of the original passes through the reverse light path of the above-described scanning optical system, is reflected by the half-mirror 104 and enters a polarizing plate 105. The polarizing direction of the polarizing plate 105 is deviated by 90° with respect to the polarizing direction of the polarizing plate 103, so that the reflected light from the original surface emergent from the polarizing plate 105 is separated from the beam light emergent from the polarizing plate 103. The reflected light from the original surface emergent from the polarizing plate 105, which has an intensity based on the picture information of the original surface, is caused to impinge on a photodetector 107 through an image forming lens 106 to generate a picture information signal. This picture information signal is applied to a picture information treatment circuit 108, where the picture information signal is subjected to a suitable coding treatment in synchronism with the deflector control signal from the first deflector means control circuit 26, and then is supplied into the aforementioned page memory 23.

According to the present invention, as has been described above, a scanning lens is disposed between a first deflector and a second deflector and the scanning lens is moved in the direction of its optic axis in association with the second deflector, whereby two-dimensional scanning strain is optically and mechanically corrected without the necessity of using complicated electrical signal treatment.

What we claim is:

1. A two-dimensional scanning device comprising:
   means for providing a light beam;
   first deflector means for deflecting said light beam to effect major scanning on a surface to be scanned;
   second deflector means for deflecting a light beam in a direction orthogonal to the direction of deflection of the light beam by said first deflector means to effect minor scanning on said surface to be scanned in a direction orthogonal to said major scanning;
   an image forming optical system disposed between said first deflector means and said second deflector means; and
   mechanical means for varying the spacing between said image forming optical system and said second deflector means in synchronism with the deflecting action of said second deflector means.

2. A two-dimensional scanning device according to claim 1, wherein between the deflection angle $\omega_2$ of said second deflector means and the variation $\Delta L$ in the distance between said second deflector means and said image forming optical system, there is the following relation:

$$\Delta L = \gamma(\sec 2\omega_2 - 1)$$

where $\gamma$ is the distance between the deflecting-reflecting surface of said second deflector means and said surface to be scanned when said deflecting-reflecting surface lies at a standard position.

3. A two-dimensional scanning device according to claim 2, wherein the rotation angle $\omega_2$ of said second deflector means has the following relation with time t:

$$\pm \omega_2 = \tfrac{1}{2} \tan^{-1} \frac{K_2}{\tau} \cdot t$$

where $K_2$ is a constant.

4. A two-dimensional scanning device according to claim 1, wherein said first deflector means is a polygon mirror rotatable at an equal angular speed, and the distance y', from a standard position, of the imaged position of the light beam on said surface to be scanned, due to the effect of the image forming characteristic of said image forming optical system, with respect to the direction of deflection by said first deflector means, is $$y' = f \cdot \omega_1$$

where f is the focal length of the image forming optical system and $\omega_1$ is the deflection angle by said first deflector means.

5. A two-dimensional scanning device according to claim 1, wherein said first deflector means is a sinusoidally vibrated mirror having an amplitude of $\phi_0$, and the distance y', from a standard position, of the position of the light beam on said scanned surface due to the effect of the image forming characteristic of said image forming optical system, with respect to the direction of deflection by said first deflector means, is $$y' = 2\phi_0 \cdot f \cdot \sin^{-1}\frac{\omega_3}{\phi_0},$$

where f is the focal length of said image forming optical system and $\omega_3$ is the deflection angle by said first deflector means.

6. A two-dimensional scanning device comprising:
   a light source portion for supplying a collimated beam;
   a first deflector for deflecting the collimated beam from said light source portion and effecting major scanning on a scanned surface;
   a second deflector for deflecting the light beam deflected by said first deflector in a plane perpendicular to the deflection plane of the light beam deflected by said first deflector and effecting minor scanning on said scanned surface;
   an image forming optical system disposed between said first deflector and said second deflector for condensing the scanning beam onto said scanned surface;
   means for moving said image forming optical system in the direction of its optic axis in synchronism with the deflecting action of said second deflector;
   first detector means for detecting the position of the deflection plane of said first deflector;
   second detector means for detecting the position of the deflection plane of said second deflector; and
   circuit means for controlling the starting and stopping of the modulation of the scanning beam in accordance with the signals from said first and second detector means.

7. A two-dimensional scanning device for scanning a stationary surface, comprising:
   means for providing a light beam;
   primary deflector means for deflecting said light beam to effect scanning on the stationary surface in one direction, and for deflecting light reflected from said stationary surface;
   secondary deflector means for effecting scanning of said light beam on the stationary surface in a direction orthogonal to said one direction and for receiving the reflected light deflected by said primary deflector means and deflecting the reflected light in a direction orthogonal to the direction of deflection of the light beam by said primary deflector means;
   light detecting means for detecting the reflected light deflected from said secondary deflector means;
   an image forming optical system disposed between said primary deflector means and said secondary deflector means; and
   mechanical means for varying the spacing between said image forming optical system and said primary deflector means in synchronism with the deflecting action of said primary deflector means.

8. A two-dimensional scanning device comprising:
   means for supplying a light beam;
   first deflector means for deflecting said light beam to effect major scanning on a surface to be scanned;
   second deflector means for deflecting a light beam in a direction orthogonal to the direction of deflection of the light beam by said first deflector means to effect minor scanning on the surface in a direction orthogonal to said major scanning:
   an image forming optical system disposed between said first deflector means and said second deflector means;
   mechanical means for varying the spacing between said image forming optical system and said second deflector means in synchronism with the deflecting action of said second deflector means;
   light dividing means disposed between said light supplying means and said first deflector means; and
   light receiving means for receiving the light beam from the surface by way of said second deflector, said image forming optical system, said first deflector means and said light dividing means in the order named.

* * * * *